United States Patent Office 3,462,168
Patented Aug. 19, 1969

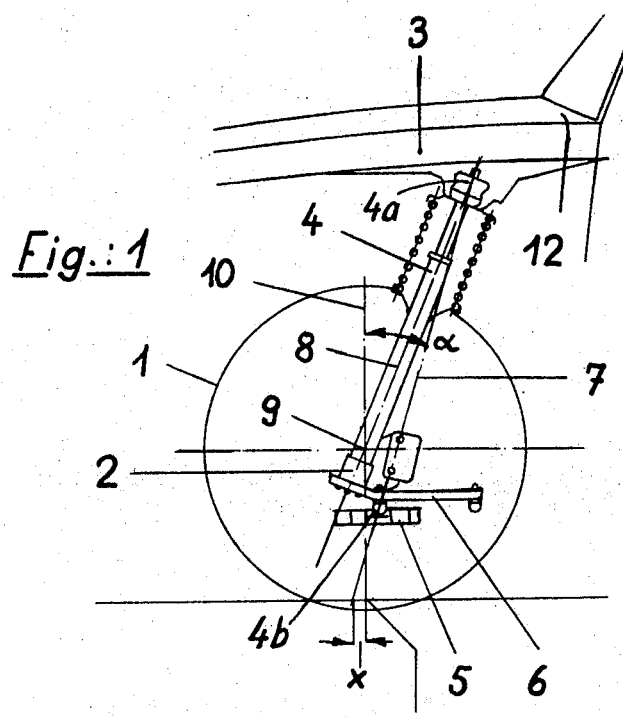
Fig.: 1
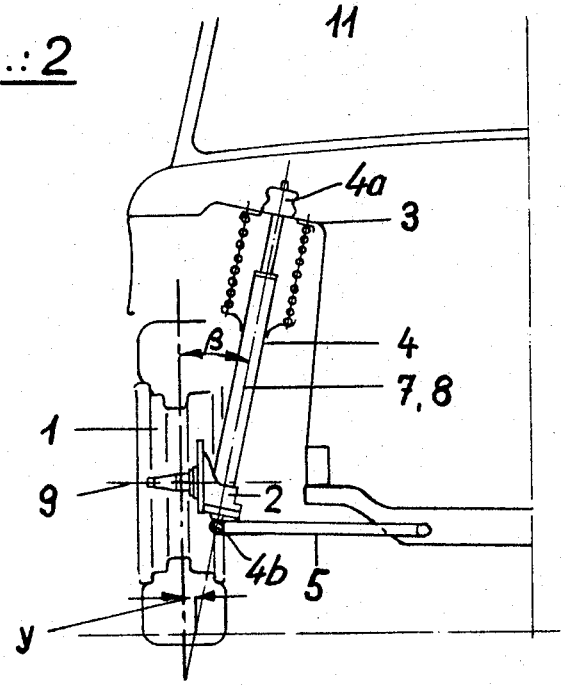
Fig.: 2

3,462,168
INDEPENDENT WHEEL SUSPENSION FOR STEERABLE WHEELS OF MOTOR VEHICLES, ESPECIALLY PASSENGER MOTOR VEHICLES
Eugen Gebler, Munich, Germany, assignor to Bayerische Motoren Werke A.G., Munich, Germany
Filed Feb. 13, 1967, Ser. No. 615,483
Claims priority, application Germany, Feb. 23, 1966, B 85,912
Int. Cl. B62d 7/14
U.S. Cl. 280—96.2                          10 Claims

ABSTRACT OF THE DISCLOSURE

An independent wheel suspension for the steerable wheels of motor vehicles, especially passenger motor vehicles, in which a steerable wheel is carried on a wheel carrier, is suspended from the vehicle body or frame on the one hand, by means of a spring element connected near its lower end with the wheel carrier and near its upper end to the vehicle body, and on the other, by means of a transverse guide arm or the like, and in which the axis of the spring element, for example, the axis of a hydraulic shock absorber intersects the vertical cross plane extending through the axis of rotation of the wheel substantially at the axis of the axle spindle while the steering axis intersects the vertical cross plane intermediate the axis of rotation of the wheel and the point of contact of the wheel with the road.

BACKGROUND OF THE INVENTION

The present invention relates to an independent suspension of the steered wheels of motor vehicles, especially passenger motor vehicles, consisting of a spring element serving as wheel guide member which is secured in its lower region at the wheel carrier and in its upper region at the vehicle body or the like as well as of at least one further guide member serving for the purpose of guidance of the wheel whereby the wheel is adapted to pivot or swivel about a steering axis which intersects the vertical transverse plane of the wheel between the point of contact of the wheel with the road and the axis of rotation of the wheel.

With such a front wheel suspension, the steering axis of the wheels is constituted in the prior art by the axis of the respective shock absorber (German Gebrauchsmuster 1,897,770).

As is known, one of the most effective measures to improve the lateral guidance of an axle consists in imparting to the wheels a negative camber in the curve. This can be achieved with steerable front wheels by a corresponding increase of the (positive) caster angle which, however, again entails an increase of the steering forces. A smaller caster, which does not impair the steering, is achieved with the aforementioned wheel suspension by a forward offset, i.e., by displacement of the wheel forwardly while maintaining the larger caster angle determinative for the camber change during cornering and therewith for the driving behavior of the vehicle so that by this measure the advantages of the larger caster angle can be fully utilized.

SUMMARY OF THE INVENTION

The present invention is now concerned with the aim to create an improvement of the known front wheel suspension while maintaining the principle of the forward offset and therewith the obtainment of a larger camber change of the steerable wheel during cornering and proposes for this purpose that the axis of the spring element and the steering axis of the wheel extend separate from one another whereby the axis of the spring element intersects the axis of rotation of the wheel or the axis of the axle spindle in a manner, known per se, and the steering axis has a smaller inclination toward the rear as viewed in the driving direction compared to the axis of the spring element.

The advantages achieved with the present invention consist in particular in that the same spring element can be used on both sides of the vehicle by the particular arrangement of the axis of the spring element and of the steering axis of the wheel which results in considerable simplification and reduction in cost as regards assembly, repair, spare parts requirements, etc.

Additionally, the arrangement according to the present invention results in a larger inclination of the spring element than with the known front wheel suspensions which thus corresponds during normal drive approximately to the direction of the shocks and impacts emanating from the road surface whence there is achieved a better response of the spring element to and shock absorption of road shocks in the vehicle longitudinal direction.

Furthermore, the known nosediving of the vehicle during braking is reduced by the large inclination of the spring element in an advantageous manner.

Accordingly, it is an object of the present invention to provide an independent wheel suspension for the steerable front wheels of a motor vehicle which considerably improves the driving and steering properties of the vehicle by extremely simple means and avoids those shortcomings and drawbacks mentioned hereinabove which are encountered with the prior art constructions.

Another object of the present invention is an independent wheel suspension for the steerable front wheels of motor vehicles which results in simplification and reduction of costs as regards assembly, repair and requirements for spare part stocks.

A further object of the present invention resides in a wheel suspension of the type described above which reduces the nosediving of the vehicle during braking.

These and further objects, features and advantages of the present invention will become more obvious from the following description when taken in connection with the accompanying drawing which shows, for purposes of illustration only, one embodiment in accordance with the present invention, and wherein:

FIGURE 1 is a schematic side view of a wheel suspension for a steerable front wheel in accordance with the present invention; and FIGURE 2 is a partial schematic front elevational view of the wheel suspension of FIGURE 1.

Referring now to the drawing wherein like reference numerals are used throughout the two views to designate like parts, the front wheel 1 of a passenger motor vehicle is suspended at a fixed part of the vehicle such as the vehicle body 3, for example, of self-supporting-type body construction, by means of a spring element 4 serving as wheel guide member which is secured in its lower region at the wheel carrier 2 and in its upper region is pivotally mounted at the vehicle body 3, for example, by means of a conventional rubber bearing 4a, as well as by a transverse guide member or swinging arm 5. The swinging arm 5 is connected to the wheel carrier by a conventional ball joint 4b. The spring element 4 consists of a conventional telescopic hydraulic shock absorber of any known construction and of a coil spring surrounding the same. The steering, i.e., the steering lever of the steering system is designated by reference numeral 6 (FIG. 1) whereby the wheel 1 is pivotally or swingably supported by the shock absorber 4 with bearing 4a and ball joint 4b for movement about the steering axis 7 which forms an obtuse angle with the plane of the road surface. The axis 8 of the spring element 4 and the steering axis 7 extend separate from each other whereby the axis 8 intersects the axis of rotation of the wheel 9 or the axis of the axle stub. The steering axis 7, compared to axis 8, has thereby a smaller inclination toward the rear as viewed in the driving direction in relation to the plane of the road surface and intersects the vertical transverse plane 10 of the wheel 1 between the wheel contact point 11 and the axis of rotation 9 of the wheel. The angle α which the steering axis 7 forms with the transverse plane 10 represents the caster angle whereas the distance x from the wheel contact point 11 to the point of intersection of the steering axis 7 with the road plane represents the caster.

By the increase of the caster angle α, the point of pivotal connection of the spring element 4 at the vehicle body 3 comes to lie in close proximity of the cowl structure 12 so that the vehicle front section is relieved far-reachingly from the support forces of the upper support mount of the spring element 4 and the additional reinforcement of the wheel case necessary heretofore can be dispensed with.

By the displacement of the point of pivotal connection of the spring element 4 toward the rear, it is additionally made possible simultaneously to incline the steering axis 7 and the axis 8 of the spring element more toward the vehicle center so that the side inclination angle β of the steering axis becomes larger and the roll radius y becomes smaller which in turn has as a consequence improved steering and driving properties, for example, straight driving properties during braking.

I claim:

1. A motor vehicle independent wheel suspension system for steerable wheels, comprising: a relatively fixed vehicle frame part; a wheel; wheel carrier means rotatably carrying said wheel for rotation about an axis; suspension means operatively mounting said wheel carrier means on said frame part for pivotal movement about a generally vertical steering axis and for spring suspension movement along a generally vertical spring axis; said suspension means including spring means extending along said spring axis and provided with a lower end fixedly connected to said wheel carrier means and an upper end pivotally connected to said frame part, and transverse guide means pivotally connected between said frame part and said wheel carrier means; said steering axis intersecting the pivotal connection between the upper end of said spring means and said frame part, intersecting the pivotal connection between said transverse guide means and said wheel carrier means, and intersecting the vertical transverse plane passing through the axis of rotation of said wheel at a point between the axis of rotation of said wheel and the contact of said wheel with a supporting surface; said spring axis intersecting said wheel axis of rotation in said transverse vertical plane; as projected on a longitudinal vertical plane, said spring axis being upwardly and rearwardly inclined and said steering axis being upwardly and rearwardly inclined at a lesser angle with respect to the vertical than said spring axis.

2. The wheel suspension according to claim 1, wherein said spring axis and said steering axis intersect each other at the pivotal connection between the upper end of said spring means and said frame part to thereby define a common plane; said common plane being inclined upwardly and transversely inwardly, and longitudinally aligned with respect to the vehicle.

3. The wheel suspension according to claim 2, wherein said spring means includes a telescopic hydraulic shock absorber aligned with said spring axis and a concentric coil spring surrounding said shock absorber.

4. The wheel suspension according to claim 2, wherein said spring axis and said steering axis each intersect a vertical longitudinal plane passing through the geometric center of said wheel at respective points below the contact of said wheel with a supporting plane.

5. The wheel suspension according to claim 4, wherein said spring means includes a telescopic hydraulic shock absorber aligned with said spring axis and a concentric coil spring surrounding said shock absorber.

6. The wheel suspension according to claim 5, including a cowl structure for the motor vehicle closely adjacent to the pivotal connection between said spring means and said frame part.

7. The wheel suspension according to claim 1, wherein said spring means includes a telescopic hydraulic shock absorber aligned with said spring axis and a concentric coil spring surrounding said shock absorber.

8. The wheel suspension according to claim 1, wherein said spring axis and said steering axis each intersect a vertical longitudinal plane passing through the geometric center of said wheel at respective points below the contact of said wheel with a supporting plane.

9. The wheel suspension according to claim 8, wherein said spring means includes a telescopic hydraulic shock absorber aligned with said spring axis and a concentric coil spring surrounding said shock absorber.

10. The wheel suspension according to claim 1, including a cowl structure for the motor vehicle closely adjacent to the pivotal connection between said spring means and said frame part.

References Cited

UNITED STATES PATENTS

| | | | |
|---|---|---|---|
| 2,507,108 | 5/1950 | Lange | 280—96.2 |
| 2,624,592 | 1/1953 | MacPherson | 280—96.2 |
| 2,992,015 | 7/1961 | Halford | 280—124 |

FOREIGN PATENTS

| | | |
|---|---|---|
| 1,189,165 | 3/1959 | France. |
| 842,551 | 7/1960 | Great Britain. |

KENNETH H. BETTS, Primary Examiner